UNITED STATES PATENT OFFICE.

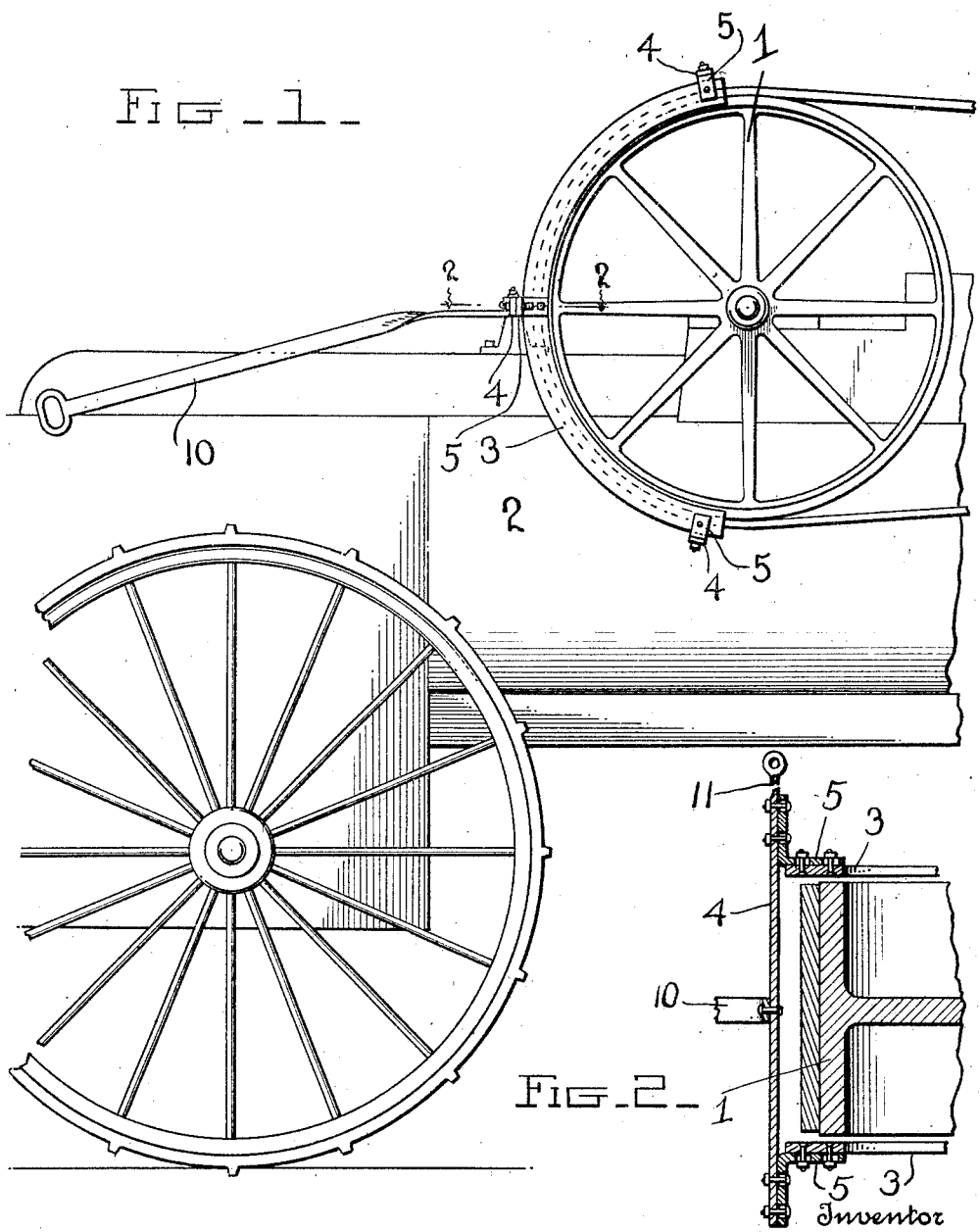

VIRGIL ROGERS, OF GIBBON, NEBRASKA.

BELT-GUIDE.

1,381,664.  Specification of Letters Patent.  Patented June 14, 1921.

Application filed January 30, 1919. Serial No. 274,029.

*To all whom it may concern:*

Be it known that I, VIRGIL ROGERS, a citizen of the United States, residing at Gibbon, in the county of Buffalo and State of Nebraska, have invented new and useful Improvements in Belt-Guides, of which the following is a specification.

This invention is an improved belt guide especially adapted for use for holding the belt on the driving wheel of a traction engine, the object of the invention being to provide an improved belt guide of this character which may be readily installed and which may be adjusted and thereby adapted to be used in connection with a wheel or driving pulley of any width.

The invention consists in the construction, combination and arrangement of devices hereinafter described and claimed.

In the accompanying drawings:—

Figure 1 is a side elevation of a belt guide constructed in accordance with my invention, and showing the same arranged for use in connection with the driving wheel of a traction engine.

Fig. 2 is a detailed sectional view of the same on the plane indicated by the line 2—2 of Fig. 1.

For the purposes of this specification the driving wheel of a traction engine is indicated at 1 and the frame of the traction engine is indicated at 2. My improved belt guide comprises a pair of segmental members 3 which are arranged at opposite sides of the wheel and at opposite sides of the belt and serve to keep the belt from slipping from the wheel. The members are connected together by brace bars 4 and by angle irons 5. Each angle iron has slots and the segmental members and brace bars are secured to the angle irons by bolts which pass through the slots of the angle irons and hence the segmental members are adjustable with respect to the brace bars and the angle irons are adjustable toward and from each other on the brace bars so that the segmental members may be arranged at any required distance apart, according to the width of the wheel and the belt. Hence the belt guide may be used on a wheel of any width.

The center brace bar has one end extended as at 11 and said extended end is pivotally mounted on the frame 2. Said pivoted brace bar thus serves to hold the belt guide and to permit the movement of the belt guide toward and from the wheel. A pull-out lever 10 is also provided which enables the belt guide to be arranged in operative relation to the wheel or to be withdrawn therefrom when it is desired to take off the belt, the said pull-out lever being also attached to the center brace bar as shown in detail in Fig. 2.

While I have thus shown and described the preferred form of my invention, I would have it understood that changes may be made in form, proportion, and construction of the several parts without departing from the spirit of my invention and within the scope of the appended claim.

Having thus described my invention, I claim:—

A belt guide of the character described comprising a pair of segmental members arranged upon opposite sides of the wheel, brace bars connecting said members together, angle irons having slots formed therein and being secured to the segmental members and brace bars, means for securing said members together, a center brace bar having one end extended and pivotally mounted upon the frame of the engine, said segmental guide members being adjustably secured to the brace bars so that said members may be moved toward and from each other according to the width of the wheel and a pull-out lever being attached to said center brace bar.

In testimony whereof I affix my signature.

VIRGIL ROGERS.